US010652289B1

(12) United States Patent
Fontanez et al.

(10) Patent No.: US 10,652,289 B1
(45) Date of Patent: May 12, 2020

(54) COMBINING DATA AND VIDEO COMMUNICATION FOR CUSTOMER SUPPORT OF ELECTRONIC SYSTEM

(71) Applicant: VCE Company, LLC, Richardson, TX (US)

(72) Inventors: Jonathan Fontanez, Raleigh, NC (US); Todd Dolinsky, Chapel Hill, NC (US); Nicholas Hansen, Willow Spring, NC (US); Matthew Molner, Cary, NC (US)

(73) Assignee: EMC IP HOLDING COMPANY LLC, Round Rock, TX (US)

(*) Notice: Subject to any disclaimer, the term of this patent is extended or adjusted under 35 U.S.C. 154(b) by 585 days.

(21) Appl. No.: 14/015,324

(22) Filed: Aug. 30, 2013

Related U.S. Application Data (60) Provisional application No. 61/695,422, filed on Aug. 31, 2012.

(51) Int. Cl.
*H04L 29/06* (2006.01)
*H04N 7/14* (2006.01)

(52) U.S. Cl.
CPC ........... *H04L 65/403* (2013.01); *H04N 7/147* (2013.01)

(58) Field of Classification Search
CPC ............ H02M 3/33523; G06F 11/0748; G06F 11/2294; G06F 11/3495; G06Q 30/016; H04L 65/602; H04L 41/5064; H04L 41/507; H04L 41/5077; H04N 7/141
USPC .......... 709/204, 205, 207, 217.219; 348/159, 348/14.02, 14.08, 14.09; 714/25
See application file for complete search history.

(56) References Cited

U.S. PATENT DOCUMENTS

| | | | | |
|---|---|---|---|---|
| 6,145,096 A | * | 11/2000 | Bereiter | G06F 11/0748 714/25 |
| 6,357,017 B1 | * | 3/2002 | Bereiter | G06F 11/0748 714/25 |
| 7,990,365 B2 | | 8/2011 | Marvit et al. | |
| 8,164,617 B2 | | 4/2012 | Mauchly | |
| 8,446,455 B2 | | 5/2013 | Lian et al. | |
| 8,914,674 B2 | * | 12/2014 | Shah | G06F 21/10 714/27 |
| 9,112,975 B2 | * | 8/2015 | Sayko | H04M 3/5191 |
| 2004/0064762 A1 | * | 4/2004 | Deshpande | G06F 11/0733 714/44 |
| 2005/0120112 A1 | * | 6/2005 | Wing | G06Q 10/06 709/224 |

(Continued)

*Primary Examiner* — Ario Etienne
*Assistant Examiner* — Kidest Mendaye
(74) *Attorney, Agent, or Firm* — Womble Bond Dickinson (US) LLP (57) ABSTRACT

A customer support technique for an electronic system includes operating a computerized apparatus to conduct a video chat with a remote customer support device. During the course of the video chat, the computerized apparatus simultaneously exchanges information pertaining to the electronic system. The computerized apparatus collects diagnostic information from the electronic system, transmits the diagnostic information to the customer support device, and receives remedial information back from the customer support device, all while the video chat continues to proceed without interruption. The improved technique thus provides a near-hands-on support experience from a remote customer support agent regardless of the customer support agent's physical location.

17 Claims, 6 Drawing Sheets

(56) References Cited

U.S. PATENT DOCUMENTS

| | | | |
|---|---|---|---|
| 2006/0200550 A1* | 9/2006 | Nelson | H04L 29/06027 709/224 |
| 2006/0229054 A1* | 10/2006 | Erola | H04M 1/24 455/403 |
| 2008/0082546 A1* | 4/2008 | Meijer | H04L 67/32 |
| 2010/0085417 A1* | 4/2010 | Satyanarayanan | H04L 12/1822 348/14.08 |
| 2010/0123770 A1 | 5/2010 | Friel et al. | |
| 2010/0217806 A1* | 8/2010 | Khot | G06Q 10/107 709/206 |
| 2012/0002001 A1 | 1/2012 | Prentice | |
| 2012/0027196 A1* | 2/2012 | Martin | G06Q 20/10 379/265.09 |
| 2012/0131416 A1* | 5/2012 | Dugan | G06F 11/32 714/760 |
| 2012/0262538 A1 | 10/2012 | Ismail et al. | |
| 2012/0266258 A1* | 10/2012 | Tuchman | H04L 63/104 726/28 |
| 2012/0307048 A1 | 12/2012 | Abrahamsson et al. | |
| 2014/0022328 A1* | 1/2014 | Gechter | G06Q 30/06 348/14.02 |
| 2014/0028449 A1* | 1/2014 | Sigal | G08C 17/02 340/12.5 |

* cited by examiner

COMBINING DATA AND VIDEO COMMUNICATION FOR CUSTOMER SUPPORT OF ELECTRONIC SYSTEM

This application claims the benefit of U.S. Provisional Application No. 61/695,422, filed Aug. 31, 2012, the contents and teachings of which are hereby incorporated by reference in their entirety.

BACKGROUND

Customer support tools for electronic systems typically include chat applications. Chat applications allow users of electronic systems to exchange messages with customer support agents, usually within browser windows over the Internet. Some chat applications take advantage of the user's webcam, to allow the user and the customer support agent to communicate face-to-face using audio and video. Sometimes, during a chat application, a customer support agent asks a user to download diagnostic software to run on the user's machine. The customer support agent provides a link to the diagnostic software, and the user manually enters the link (e.g., in a new tab of the browser) to download the software. The user then runs the diagnostic software on the user's machine and reports back to the customer support agent any identified problems.

SUMMARY

An improved customer support technique for an electronic system includes a computerized apparatus conducting a video chat with a remote customer support device. While the computerized apparatus conducts the video chat, the computerized apparatus simultaneously exchanges information pertaining to the electronic system. The computerized apparatus collects diagnostic information from the electronic system, transmits the diagnostic information to the customer support device, and receives back remedial information from the customer support device, all while the video chat continues to proceed without interruption. The improved technique thus provides a near-hands-on support experience from a remote customer support agent regardless of the customer support agent's physical location.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. The drawings are not necessarily to scale, emphasis instead being placed upon illustrating the principles of the various embodiments. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

Converged IT (Information Technology) Infrastructures, referred to herein by the acronym "CITIs," are sophisticated electronic systems that include a variety of components, such as computing resources, storage resources, and network resources, for example. CITIs may also include management tools, security tools, and virtualization platforms. Examples of commercially available CITIs are the Vblock™ family of systems from VCE Company, LLC, of Richardson, Tex. Vblock™ systems provide out-of-the-box IT infrastructures for cloud computing solutions.

The high levels of complexity and sophistication of CITIs can place high demands on customer support applications. When CITIs behave in an unexpected manner, conventional customer support applications often fall short in their ability to identify and resolve improper conditions. Conventional chat applications, even those providing face-to-face video chat, are often ill equipped to handle the diagnostic and remedial demands of CITIs and other complex electronic systems.

In contrast with conventional applications, an improved customer support technique for an electronic system includes operating a computerized apparatus to conduct a video chat with an agent on a remote customer support device. During the course of the video chat, the computerized apparatus simultaneously exchanges information pertaining to the electronic system, providing a near-hands-on support experience from the customer support agent regardless of the customer support agent's physical location.

Figure 1:
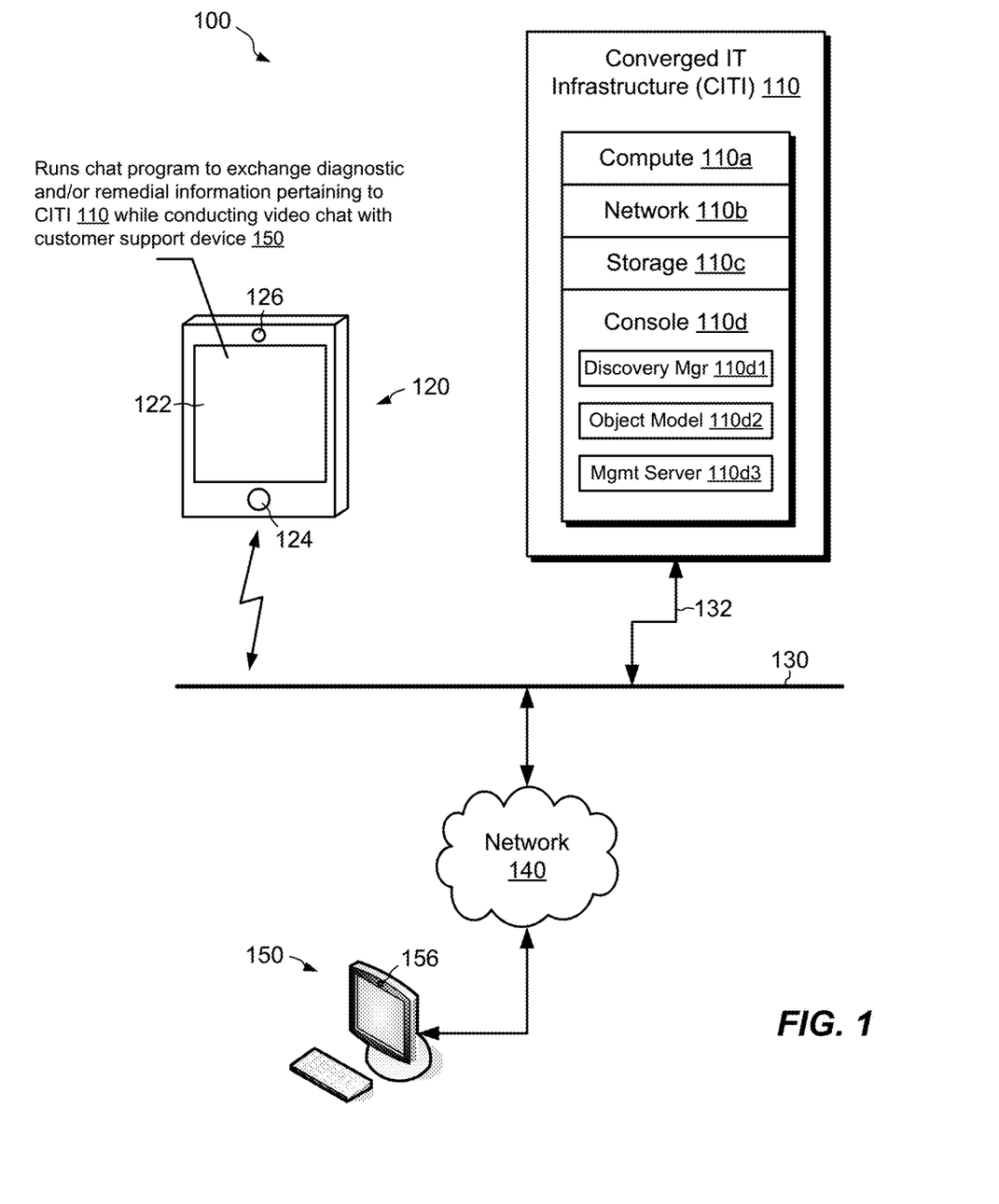
FIG. 1 is a block diagram of an example environment in which embodiments of the invention hereof can be practiced.

FIG. 1 shows an example environment 100 in which embodiments of the improved technique can be practiced. Here, an electronic system 110 and a computerized apparatus 120 each connect to a local area network (LAN) 130. For example, the electronic system 110 connects to the LAN 130 via an Ethernet cable 132 and the computerized apparatus 120 connects to the LAN 130 wirelessly, e.g., using a Wi-Fi (IEEE 802.11) networking standard. The LAN 130 itself connects to a network 140, such as a wide area network (WAN), the Internet, some other network, or some combination of networks. A router or some other networking device or devices (not shown) connects the LAN 130 to the network 140. A customer service device 150 also connects to the network 140, using any of the above described means, or some other means. The particular arrangement shown is merely illustrative.

In an example, the electronic system 110 is located in a data center or other site for housing computerized equipment, whereas the customer service device 150 is located remotely, e.g., in a different room, building, city, state, country, etc. Any such data center or other site may house any number of electronic systems like the system 110.

In the example shown, the computerized apparatus 120 has a touch screen 122, a button 124, and a camera 126. In an example, the computerized apparatus 120 is a portable computing device, such as a tablet computer (e.g., an iPad, Windows tablet, Android tablet, etc.). However, this is not required, as the computerized apparatus 120 may be provided in any suitable form, such as that of a work station, a desktop computer, a laptop computer, a smart phone, a PDA (personal data assistant), or, more generally, any computerized apparatus capable of running programs, connecting to a computer network (such as the LAN 130), and conducting a video chat. In some implementations, the computerized apparatus 120 is part of the electronic system 110. In other implementations, the computerized apparatus 120 is separate from the electronic system 110. Preferably, the computerized apparatus 120 is a mobile device of some sort, which an administrator or other user can carry by hand, for working with and around the electronic system 110 while conducting a video chat with a customer support agent operating the customer support device 150.

The customer support device 150 has a camera 156, for conducting a video chat with the user of the computerized apparatus 120. The customer support device 150 may be implemented in any suitable way, limited only in that it must be capable of running programs, connecting to a network, and conducting a video chat. Although the word "device" is used to describe the customer service device 150, it is understood that the customer service device 150 may include any number of components connected together and that the customer service device 150 is therefore not limited to being a single manufactured item. With the generality of the customer service device 150 kept in mind, it should be understood that the customer service device 150 may itself be implemented as a mobile device, such as a tablet computer and may in fact be provided in a configuration similar to that of the computerized apparatus 120. In an example, the customer support device 150 provides customer support to any number of customers for supporting any number of electronic systems like the system 110.

In some arrangements, the computerized apparatus 120 is operated by a customer who owns or operates the electronic system 110. In other arrangements, the computerized apparatus 120 is operated by field service support personnel visiting a customer site, or by some other user.

The electronic system 110 may be provided in the form of a converged IT infrastructure (CITI), which may be used, for example, for hosting cloud-based computing solutions. The CITI may include compute resources 110*a* (e.g., server blades), network resources 110*b* (e.g., network blade switches), storage resources 110*c* (e.g., data storage arrays), and a console 110*d*. The various resources 110*a* through 110*d* are typically installed in one or more chassis housed in one or more racks, which provide space, power, cooling, interconnections, data communication, and environmental monitoring for the CITI.

The console 110*d* includes one or more computers that provide tools for managing and controlling the CITI. The tools include, for example, a discovery manager 110*d*1, an object model 110*d*2, and a management server 110*d*3. The discovery manager 110*d*1 performs discovery operations to obtain a configuration of the CITI, including its installed components, firmware versions, software versions, model numbers, serial numbers, performance metrics, and relationships to one another, for example. The object model 110*d*2 stores a persistent logical representation of the discovered components and characteristics of the CITI, and thus may serve as a central repository for information about the CITI. The management server 110*d*3 acts as an interface between the CITI and its environment. In an example, the management server 110*d*3 includes interfaces for querying the object model 110*d*2 and providing CITI-specific information to clients accessing the CITI over a network, e.g., over the LAN 130. In a particular example, the management server 110*d*3 includes a version of vCenter from VMware®, which has been modified with a plug-in that supports the display and management of CITIs (e.g., Vblock™ systems).

In example operation, a user of the computerized apparatus 120 launches a program (application, app, service, widget, etc.) on the computerized apparatus 120 to operate a management client installed on the computerized apparatus 120. The management client running on the computerized apparatus 120 accesses, over the LAN 130, the management server 110*d*2 on the CITI (as well as management servers 110*d*2 of other CITIs, if there are any) to display CITI-specific information on the touch screen display 122. The user selects a CITI from the touch screen display 122 and operates the client's user interface to launch a chat session for the selected CITI. A chat program runs on the computerized apparatus 120 and establishes a connection with the customer support device 150 over the LAN 130 and the network 140. The chat program may be part of the management client or separate. With the connection established, the user may conduct a face-to-face video chat with the customer support agent.

The chat program includes both a video channel and a data channel. The video channel carries full duplex video and audio information for conducting the chat session, whereas the data channel supports an exchange of diagnostic and/or remedial information, and in some cases additional information, between the computerized apparatus 120 and the customer support device 150. In an example, the video channel and the data channel are logical channels, rather than physically distinct channels, with information for both channels being transferred over a common connection to the LAN 130 and/or network 140.

While a video chat takes place, the user may operate the management client and/or the chat program on the computerized apparatus 120 to perform various functions. For example, the user operates a control of the chat program to gather diagnostic information from the selected CITI. In response, the chat program sends a message to the management server 110*d*3 of the selected CITI directing the management server 110*d*3 to perform diagnostic tests on the CITI, gather the results, and return the information to the chat program running on the computerized apparatus 120. Once the chat program receives the diagnostic information, the chat program sends the diagnostic information, over the data channel, to the customer support device 150 to be viewed by the customer support agent, all while the video chat continues uninterrupted.

The customer support agent may then view the diagnostic information about the selected CITI and provide remedial information. The remedial information may take a variety of forms, such as links to firmware revisions, links to software revisions, the revision files themselves, other files, programs, or other data or metadata. The remedial information may also take the form of documentation describing the proper order in which to apply remedial software and/or firmware revisions, as well as descriptions of any manual or automated steps needed to successfully remediate the CITI. The customer support agent sends the remedial information back to the computerized apparatus 120, which receives the remedial information over the data channel while the video chat over the video channel continues uninterrupted.

In an example, the remedial information includes a link to a firmware or software revision and the chat program presents the link to the user on its user interface displayed on the touchscreen 122. The user has the option to tap (click, or otherwise select) the link to download the revision. In one example, tapping the link causes the revision to be downloaded to the computerized apparatus 120. In another example, tapping the link causes the revision to be downloaded directly to the CITI. The chat program then presents a control on its user interface that allows the user to install the downloaded revision on the CITI. When the user operates the control, the chat program directs the CITI to install the revision on the CITI (or copies the revision to the CITI and then directs the CITI to install the revision).

The above-described process of gathering diagnostic information from the CITI, transmitting the gathered diagnostic information to the customer support device 150 over the data channel, and receiving remedial information over the data channel, all while the video chat continues uninterrupted, may be repeated as many times as necessary until all improper conditions with the CITI have been resolved. The combination of video chat with data communication provides the customer service agent with a near-hands-on support experience, and allows the user and the customer support agent to work together effectively to restore the CITI to proper operating condition.

Although the example above provides that the user initiates the chat session with the customer support agent, the customer support agent may alternatively initiate the chat session with the user. In an example, the customer support device 150 runs a chat program that is similar to the chat program that runs on the computerized apparatus 120. The chat program on the customer support device 150 may provide separate video and data channels, to enable the exchange of data within the chat application while the video chat proceeds without interruption. The customer support agent may thus start the chat program on the customer support device 150 and initiate a chat session with the user of the computerized apparatus 120.

Figure 2:
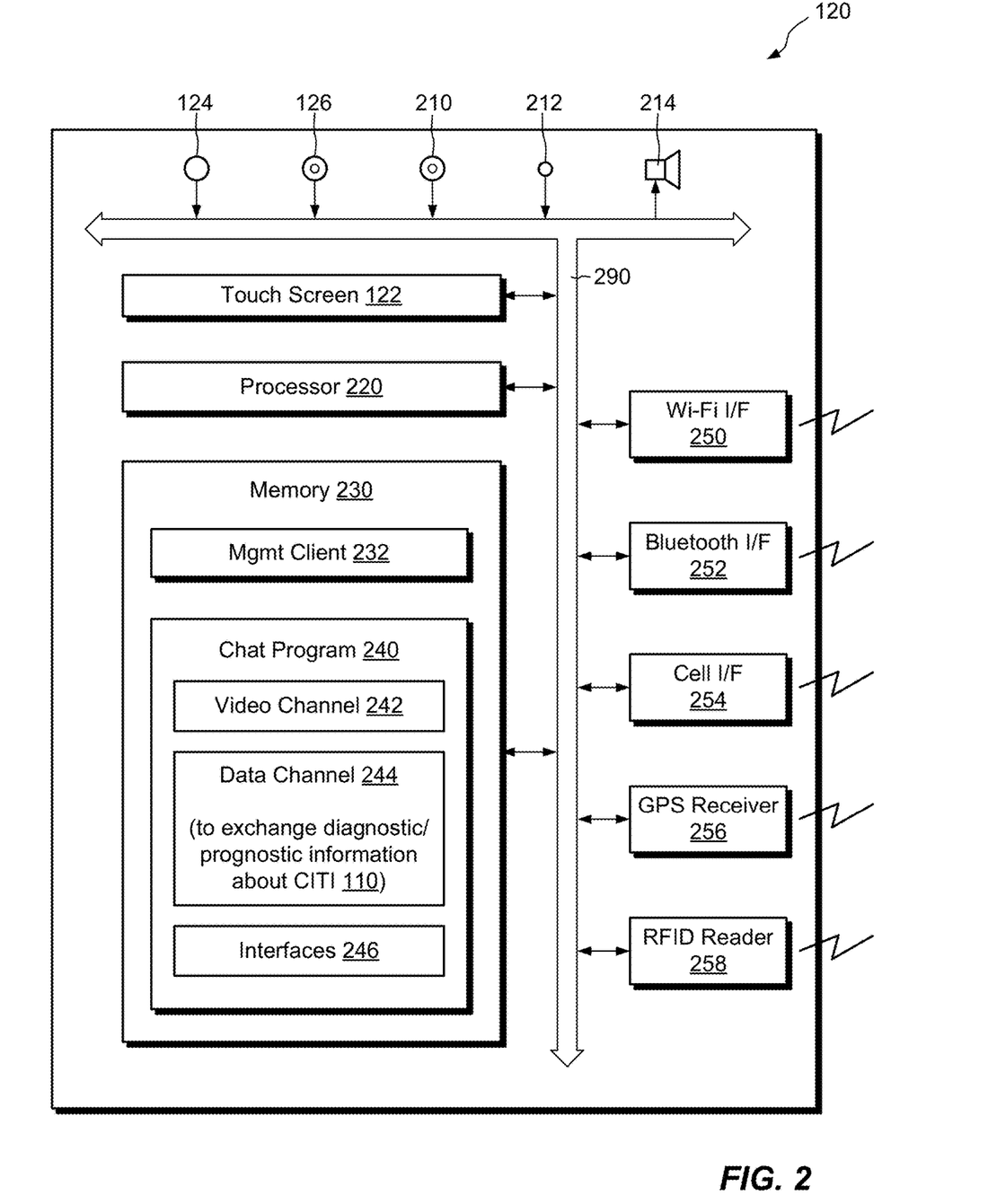
FIG. 2 is a block diagram of an example computerized apparatus as shown in FIG. 1, which can be used for conducting a video chat with a remote customer service agent.

FIG. 2 shows an example computerized apparatus 120 in greater detail. In addition to the touch screen 122, button 124, and camera 126 already described, the computerized apparatus 120 also includes a rear-facing camera 210, a microphone 212, and a speaker 214. Optionally, the rear-facing camera 210 may be used to send the customer support agent the user's view of the CITI, to assist with diagnoses, and the user may operate a control to toggle between the two cameras. The microphone 212 and speaker 214 respectively send and receive audio signals that accompany the video chat.

The computerized apparatus 120 is further seen to include a processor 220 (i.e., one or more processing chips and/or assemblies) and memory 230. The memory 230 includes both volatile memory (e.g., RAM) and non-volatile memory, such as one or more disk drives, solid state drives (SSDs) and the like. The processor 220 and the memory 230 together form control circuitry, which is constructed and arranged to carry out various methods and functions as described herein. Also, the memory 230 includes a variety of software constructs realized in the form of executable instructions. When the executable instructions are run by the processor 220, the processor 220 is caused to carry out the operations of the software constructs.

The computerized apparatus 120 is further seen to include various wireless interfaces, such as a Wi-Fi interface 250, a Bluetooth interface 252, a cellular telephone interface 254, a GPS (Global Positioning Satellite) receiver 256, and an RFID (Radio Frequency Identification) reader 258. Each of these interfaces find application in various embodiments hereof but are optional in others.

A bus 290 interconnects the various components of the computerized apparatus 120 and provides a vehicle for communicating among such elements. In various examples, the bus 290 is implemented as a system bus or as multiple distinct busses, each serving a respective sub-system of the computerized apparatus 150 and having interconnections to the others. It is understood that certain elements are omitted from FIG. 2 for simplicity, such as circuitry for interfacing analog components 124, 126, 210, 212, and 214 to the bus 290, and that those skilled in the art could readily reproduce such missing elements.

The memory 230 includes various software constructs, such as the above-described management client (232) and chat program (240). The chat program 240 provides the above-described video channel (242), for conveying full-duplex video during customer support chat sessions, and the above-described data channel (244), for exchanging diagnostic and/or remedial information pertaining to a CITI or other electronic system 110. The chat program 240 may operate the video channel 242 and the data channel 244 simultaneously, to exchange data over the data channel 244 while a video chat proceeds without interruption over the video channel 242. The chat program 240 further includes interfaces 246, for sending and/or receiving data from the various wireless interfaces 250, 252, 254, 256, and 258. In some examples, the video channel 242 and data channel 244 are implemented as interfaces within an application layer of the chat program 240. Although certain software constructs are specifically shown and described, it is understood that the memory 230 typically includes many other software constructs, which are not shown, such as an operating system and various applications, processes, services, and the like.

Figure 3A:
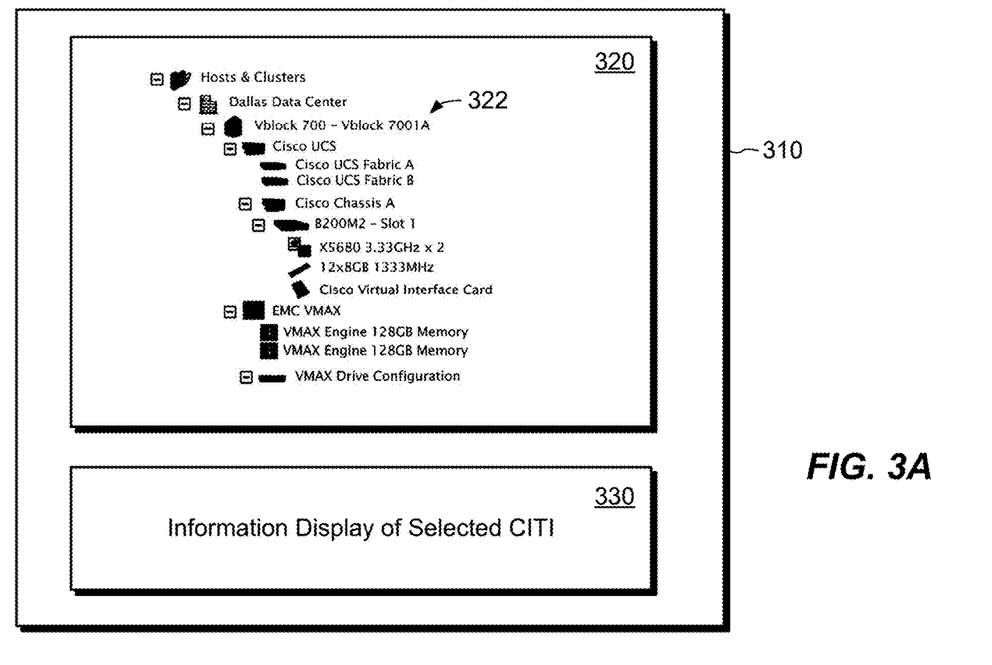
FIGS. 3A and 3B are screen shots showing an example tree-based representation of an electronic system as shown in FIG. 1.
Figure 3B:
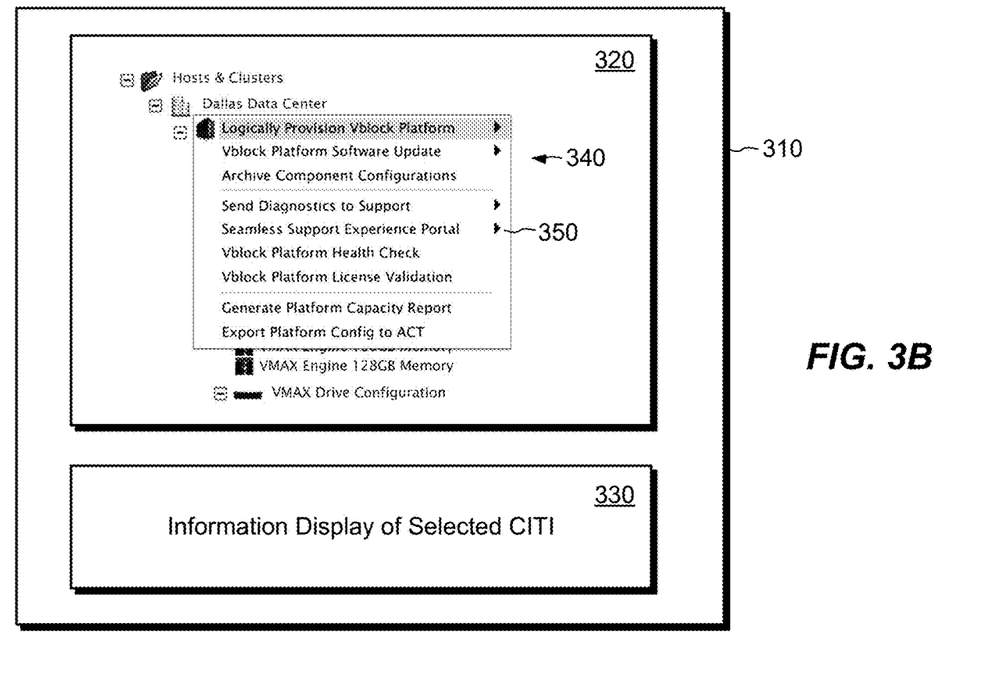

FIGS. 3A and 3B show example screen shots of the management client 232 as displayed on the touch screen 122 of the computerized apparatus 120. As shown in FIG. 3A, an example screen shot 310 includes a first pane 320 and a second pane 330. The first pane 320 displays a tree-based representation of various CITIs, whereas the second pane 330 displays detailed information about CITIs or components thereof selected in the first pane 320. In an example, users must authenticate to run the management client 232, and each authenticated user is allowed to view particular CITIs. The illustrated screen shot 310 shows CITIs housed in the "Dallas Data Center," which include a CITI with an identifier 322, which reads, "Vblock 700-Vblock 7001A." Various components of this CITI are listed subordinately in the tree-based representation. The user may select (e.g., tap or click) any of the displayed components in the first pane 320 to list detailed information about the selected component in the second pane 330. In an example, selecting a component displayed in the first pane 320 causes the management client 232 to send a query to the management server 110*d*3 of the electronic system 110 (e.g., the "Vblock 700-Vblock 7001A" CITI). In response to the query, the management server 110*d*3 queries the object model 110*d*2 to obtain the requested information and returns the requested information to the management client 232, which displays the information in the second pane 330.

FIG. 3B shows a result of the user selecting the identifier 322, e.g., by long-tapping or right-clicking, etc., to display a context-sensitive menu 340, which provides the user with various options for performing actions in relation to the selected CITI. Among the available options is option 350, i.e., to enter a "Seamless Support Experience Portal." In an example, selecting the option 350 causes the management client 232 to launch the chat program 240.

In the illustrated example, the chat program 240 may be invoked both from within the management client 232 and independently of the management client 232, e.g., as an "app" that users can run by selecting an icon on a home screen of the computerized apparatus 120. Alternatively, the chat program 240 runs as part of the management client 232 (e.g., as a plug-in or add-on). In further examples, the arrangement is reversed and the management client 232 runs as a plug-in or add-on of the chat program 240. In addition, it should be understood that the management client 232 as shown in FIGS. 3A and 3B is merely an example. Other management clients may be used, having characteristics that differ from those shown in FIGS. 3A and 3B. For example, not all implementations of the management client 232 must present CITIs in the form of tree-based representations.

Figure 4:
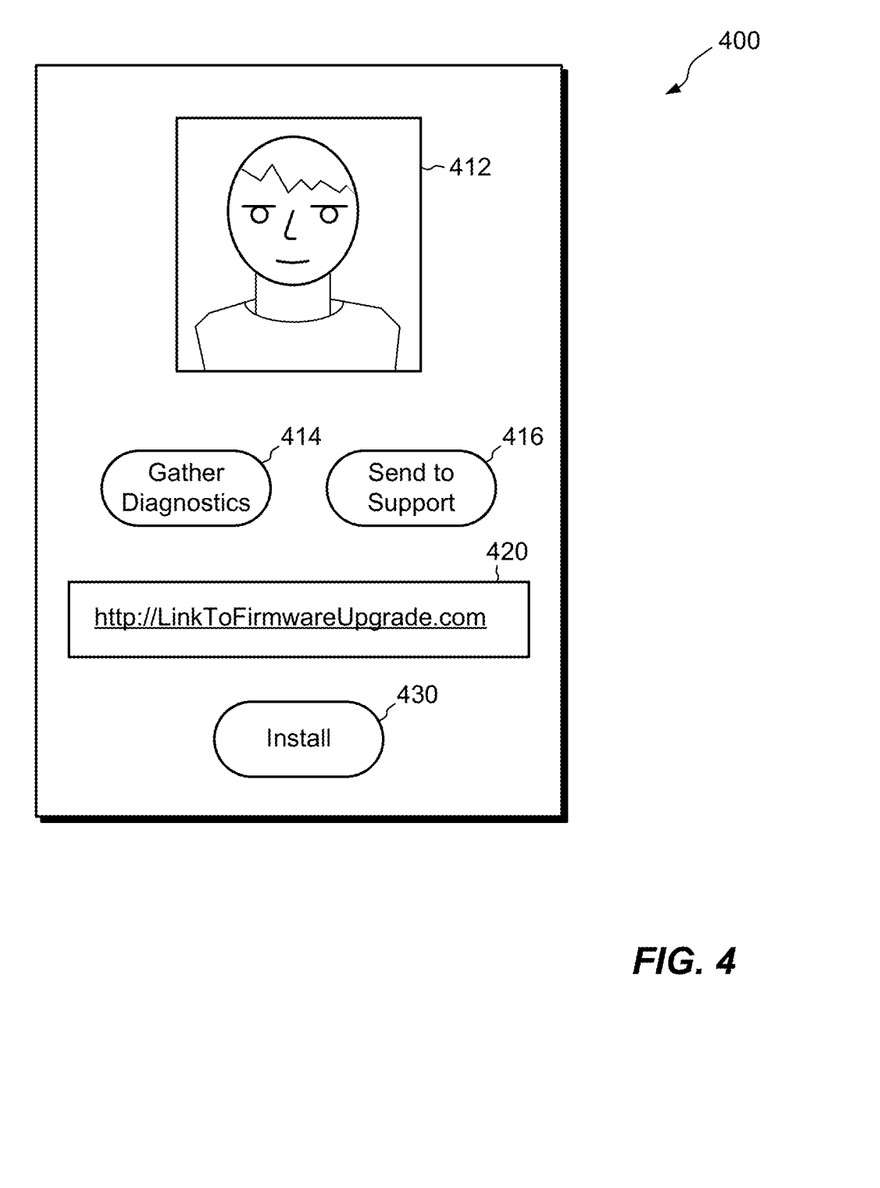
FIG. 4 is a screen shot showing an example display of a video chat program operated on the computerized apparatus of FIG. 2.

FIG. 4 shows an example screen shot 400 produced by the chat program 240 and viewed on the touch screen 122 of the computerized apparatus 120. In the illustrated view, a video chat session is shown in progress with a live video image of the customer support agent displayed in a window 412. The customer support device 150 may show a similar view, but with an image of the user displayed in a window similar to the window 412. The user and the agent can thus converse face-to-face and without interruption over the video channel 242, while at the same time exchanging information (e.g., metadata and data pertaining to the selected CITI) over the data channel 244. The user may initiate the chat in response to the user discovering some improper condition on the selected CITI. Improper conditions may include, for example and without limitation, an error message, warning, or other indication that attention is required, such as on account of a software and/or firmware of a component of the CITI being out of date or inconsistent with other software and/or firmware versions.

As shown, the user may perform a number of actions during the course of the video chat. For example, by tapping (or otherwise selecting) a "Gather Diagnostics" button 414 (or by activating some other type of control), the chat program 240 communicates with the selected CITI to gather diagnostic information (in the manner described above). By tapping (or otherwise selecting) a "Send to Support" button 416 (or other control), the chat application 240 transmits the gathered diagnostic information to the customer support device 150 over the data channel 244, while the video chat proceeds over the video channel 242 without interruption.

The customer support agent receives and views the diagnostic information. The customer support agent may then identify one or more remedial measures and send remedial information addressing any improper condition(s) revealed in the diagnostic information back to the computerized apparatus 120, which receives the remedial information over the data channel 244. In the example shown, the diagnostic information indicates an improper firmware revision of a component of the CITI and the remedial information includes an active link 420 to the proper firmware revision. The proper firmware revision may be an upgrade to a more recent version; alternatively, the proper firmware version may be a roll-back to a previous version, for example, if the improper condition indicates an incompatibility with other software or firmware running on the CITI. If the user wishes to make the recommended change on the CITI, the user may tap (or otherwise select) the active link 420 to download the proper firmware. Thus, the user retains the choice to accept the recommended change or not, keeping the user in control of the configuration of the CITI. As already described, the user selecting the active link 420 may cause the firmware to be downloaded to the computerized apparatus 120 or directly to the selected CITI. When the user then taps (or otherwise selects) the "Install" button 430 (or other control), the chat application directs the CITI to install the downloaded firmware. Again, the user has the choice whether to perform this step or not. The above-described actions of gathering diagnostics, sending the diagnostics to support, receiving a link to a different version, and installing the different version (or not, based on user choice) can be repeated as many times as necessary to resolve all improper conditions. These actions can take place while the video chat proceeds without interruption, thereby promoting a near-hands-on support experience.

The customer service agent may employ numerous techniques for recommending remedial measures based on the diagnostic information received from the computerized apparatus 120. For example, the customer support agent may have access to a detailed knowledge database. The agent may enter keywords or descriptions of the indicated improper conditions into the knowledge database and receive back remedial recommendations. In further examples, the diagnostic information received from the computerized apparatus 120 is fed directly into an expert system, which analyzes the diagnostic information and generates lists of potential remedial actions, which the customer support agent may choose, based on his or her own expertise, to recommend to the user.

Figure 5:
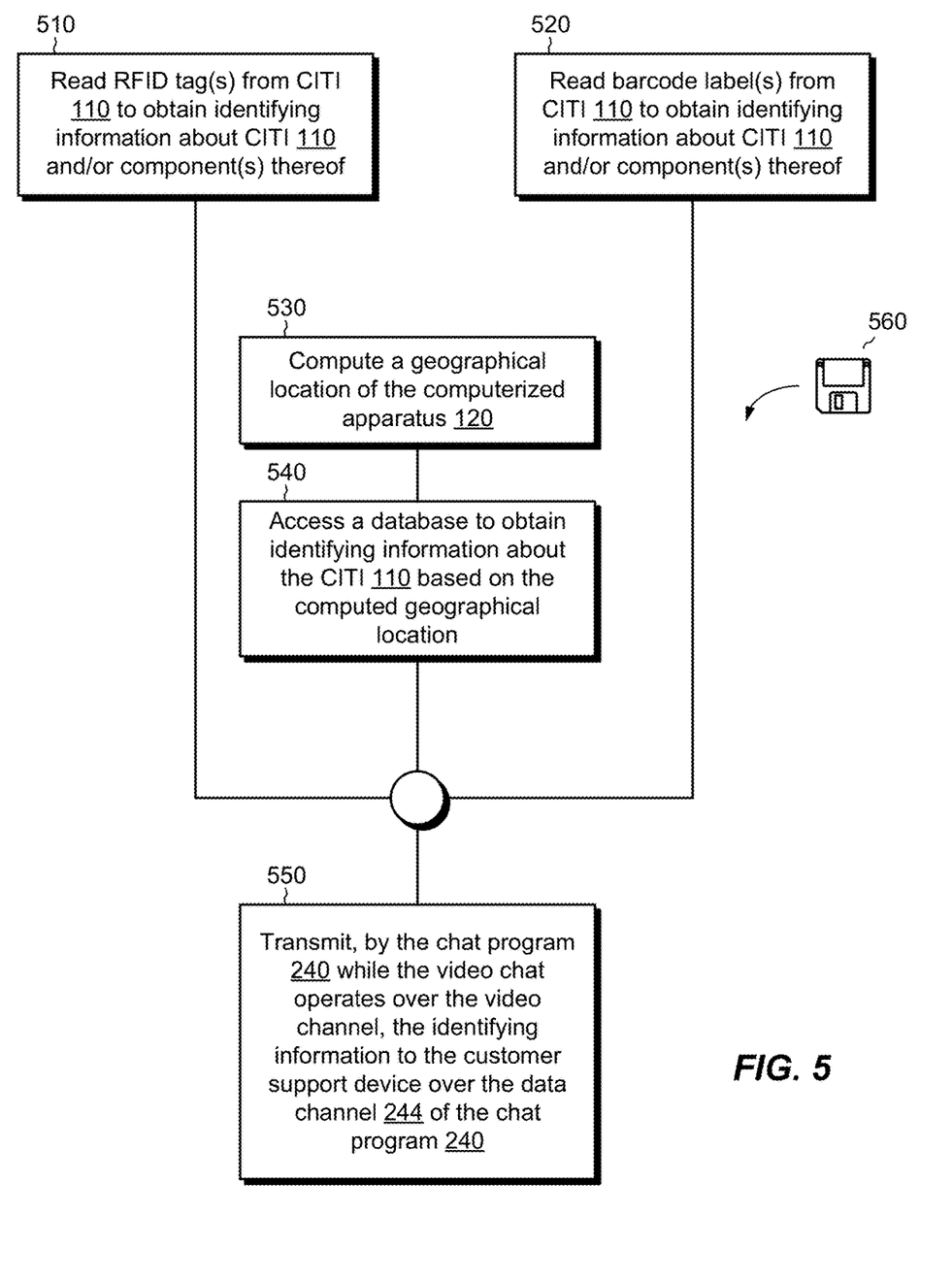
FIG. 5 is a flow chart showing various example processes for identifying a particular electronic system for which customer support is sought, and/or for identifying particular components of the electronic system.
Figure 6:
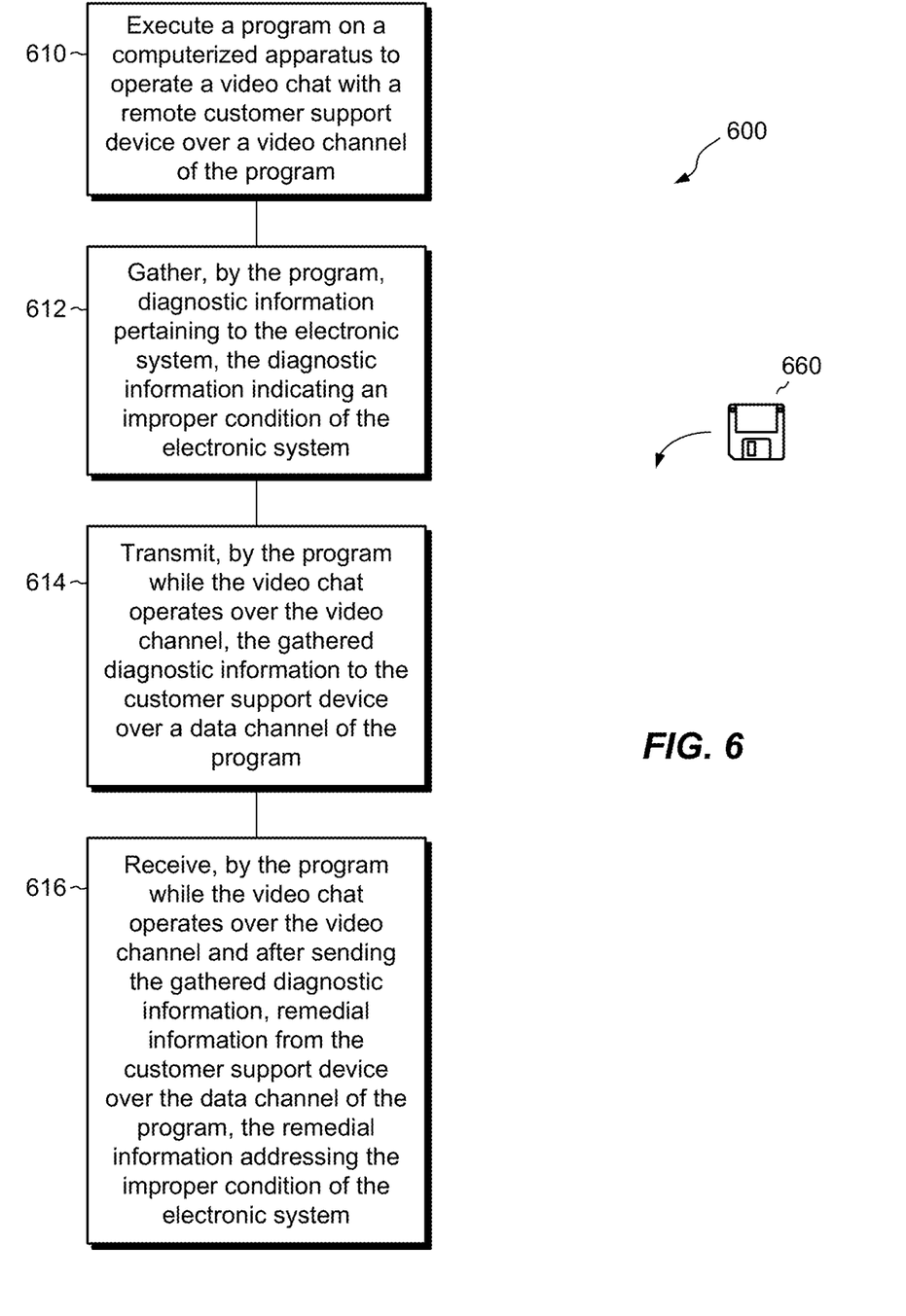
FIG. 6 is a flow chart showing an example process for obtaining customer support for an electronic system, such as that shown in FIG. 1.

FIGS. 5 and 6 show processes that may be carried out in connection with the computerized apparatus 120. These processes are typically performed by the software constructs, described in connection with FIG. 2, which reside in the memory 230 of the computerized apparatus 120 and are run by the processor 220. The various acts of each process may be ordered in any suitable way. Accordingly, embodiments may be constructed in which acts are performed in orders different from those illustrated, which may include performing some acts simultaneously, even though the acts are shown as sequential in the illustrated embodiments.

FIG. 5 shows three example processes that the chat program 240 may employ to identify a particular CITI for which a customer support session is to be conducted. In the examples of FIG. 5, the chat program 240 may be run independently of the management client 232, such that the chat program 240 uses some other means to identify a selected CITI besides selecting the CITI from the tree-based representation of FIG. 3A. Three different processes are shown, which share a common step 550. The three processes may be used as alternatives or in any combination. In the examples described, the processes of FIG. 5 are carried out while a video chat with a customer service agent is taking place, i.e., after the chat program 240 has already initiated a chat session. In other examples, however, processes similar to those shown in FIG. 5 may be conducted prior to establishing a video chat with the customer service agent.

At step 510 and in accordance with a first process for identifying a CITI, the chat program 240 reads one or more RFID tags from a CITI, to obtain identifying information about the CITI. For example, the CITI may include an RFID tag that identifies the CITI, e.g., by customer, serial number, name, etc., and the chat program 240, operating through the interfaces 246, directs the RFID reader 258 to read the RFID tag.

At step 550, the chat program 240 transmits the identifying information to the customer support device 150. For example, the chat program 240 transmits the identifying information over the data channel 244 while the video chat with the customer support agent continues over the video channel 242 without interruption.

In addition to obtaining identifying information about the CITI, the chat program 240 may also obtain, e.g., from other RFID tags, other information about the CITI, as well as information about various components of the CITI, such as circuit boards, chassis, assemblies, etc. The chat program 240 may transfer such information over the data channel 244 to the customer support device 150, to better inform the customer support agent about the configuration of the particular CITI.

At step 520 and in accordance with a second process for identifying a CITI, the chat program 240 reads one or more barcode labels from a CITI to obtain identifying information about the CITI. Here, the chat program 240 employs the camera 126 (or the rear-facing camera 210) to take a photograph of a barcode label (or multiple barcode labels) provided on or in connection with the CITI. In an example, the chat program 140 prompts the user to take a photograph of a barcode label on the CITI. The user may use the front-facing camera for this purpose, briefly interrupting the face-to-face conversation with the agent, to take the requested picture. Alternatively, the user may toggle the camera view to activate the rear-facing camera 210 and manually take the requested picture using the rear-facing camera 210, while the face-to-face video chat with the customer support agent continues without interruption. Once the camera (126 or 210) has acquired an image of the barcode label, the chat program 240 processes the image to convert the barcode image to its corresponding text, where the text describes identifying information about the CITI. Control then proceeds as before to step 550, whereupon the chat program 240 transmits the identifying information to the customer support device 150. For example, the chat program 240 transmits the identifying information over the data channel 244 while the video chat with the customer support agent continues over the video channel 242 without interruption. It is understood that the chat program 240 may obtain photographs of any number of barcode labels on or in connection with the CITI, such as for various assemblies, subassemblies, components, etc., convert the barcodes to text, and transmit the text to the customer support device 150, where they may assist the customer support agent in obtaining additional information about the CITI.

At step 530 and in accordance with a third process for identifying a CITI, the chat program 240 computes a geographical location of the computerized apparatus 120. In one example, the GPS receiver 256 receives GPS signals and computes latitude and longitude of the current location. In another example, the computerized apparatus 120 uses network information, e.g., obtained from the Wi-Fi interface 250, cellular triangulation, e.g., from the cell interface 254, and/or other techniques to obtain the current geographical location.

At step 540, a database is accessed to obtain identifying information about the CITI based on the computed geographical location. For example, the chat program 240 accesses the database, which stores information for cross-referencing geographical locations with CITI identification information. The chat program 240 queries the database to obtain the identification information for a CITI based on the computed geographical location. No direct interaction between the computerized apparatus 150 and the CITI is thus required. Rather, the mere co-location of the computerized apparatus 150 and the CITI are sufficient to identify the CITI for the purpose of conducting a customer support session. With the identifying information of the CITI thus obtained, control can proceed to step 550 as described above, where the chat program 240 transmits the identifying information to the customer support device 150 over the data channel 244 while the video chat continues over the video channel 242 without interruption.

In an alternative implementation, the customer support device 150, rather than the computerized apparatus 120, performs the step 540. For example, the chat program 140 running on the computerized apparatus 120 transmits the computed geographical location to the customer support device 150, and the customer support device accesses the database to obtain identifying information about the CITI based on the received geographical location. In various implementations, the database may be located on the computerized apparatus 120, on the customer support device 150, or at some location on a network accessible by the computerized apparatus 120 and/or the customer support device 150.

According to a further variant of this third CITI identifying process, the computerized apparatus 120 runs a mapping program, which may be provided as part of the chat program 240 or as a separate program that operates in coordination with the chat program 240. The mapping program causes the computerized apparatus 120 to display a map that shows the geographical location of the computerized apparatus 120 as well as the geographical location(s) of any CITIs in the vicinity of the computerized apparatus 120. For example, the mapping program accesses the database to obtain geographical locations of CITIs within the vicinity of the computerized apparatus 120 and renders icons on the map at the obtained locations. In some examples, the CITIs returned from the database may be limited to those of a particular customer or organization. The map displays CITIs in the form of icons. By selecting any such icons (e.g., by tapping, clicking, etc.), the chat program 140 sends geographical information and/or identifying information about the selected CITI to the customer support device 150. The computerized apparatus 120 and the customer support device 150 may then exchange diagnostic and/or remedial information about the identified CITI in the manner described above.

FIG. 6 shows an example process 600 for obtaining customer support for an electronic system. At step 610, a program is executed on a computerized apparatus to operate a video chat with a remote customer support device over a video channel of the program. For example, the computerized apparatus 120 executes the chat program 140 to operate a video chat over the video channel 242. The chat program 140 may be initiated from a home screen of the computerized apparatus 120. Alternatively, the chat program may be initiated from the context-sensitive menu 340 (as shown in FIG. 3) displayed by the management client 232, or from some other software construct. In an example, the chat program 240 conducts a face-to-face video chat between a user of the computerized apparatus 120 and a customer support agent operating the customer support device 150.

At step 612, the program gathers diagnostic information pertaining to the electronic system, where the diagnostic information indicates an improper condition of the electronic system. The improper condition may present itself as an error, a warning, or some other message or detectable event signaling an issue that may require attention. In one example, the chat program 140 displays a screen 400 on the touch screen 122 of the computerized apparatus 150, which includes a "Gather Diagnostics" button 414. In response to the user selecting the button 414, the chat program 140 communicates over the LAN 130 with the management server 110d3 of the CITI 110. The management server 110d3 queries the object model 110d2 to obtain the requested diagnostic information, which it returns to the chat program 140. In another example, the management client 232 communicates over the LAN 130 with the management server 110d3 of the CITI 110 to obtain the diagnostic information directly. The management server 110d3 queries the object model 110d2 to obtain the diagnostic information, which it returns to the management client 232.

At step 614, the program transmits the gathered diagnostic information to the customer support device over a data channel of the program while the video chat operates over the video channel. For example, the screen 400 includes a "Send to Support" button 416. In response to the user selecting the button 416, the chat program 140 sends the gathered diagnostic information to the customer support device 150 over the data channel 244, while the face-to-face video chat between the user and the customer support agent proceeds without interruption.

At step 616, the program receives remedial information from the customer support device over the data channel after sending the diagnostic information, while the video chat operates over the video channel. The remedial information addresses the improper condition of the electronic system. For example, the improper condition may represent an improper firmware revision of a component of the CITI and the remedial information addressing this condition includes a link to a proper firmware version. The chat program 140 receives the link (e.g., the link 410), over the data channel 244, while the video chat proceeds (e.g., in the window 412) without interruption.

An improved customer support technique has been described for an electronic system 110, such as a converged IT infrastructure (CITI). The improved technique includes operating a program, such as the chat program 140, on a computerized apparatus 120 to conduct a video chat with a remote customer support device 150. During the course of the video chat, the program 140 simultaneously exchanges metadata and/or data pertaining to the electronic system 110. Using the improved technique, the program collects diagnostic information from the electronic system 110, transmits the diagnostic information to the customer support device 150, and receives remedial information back from the customer support device 150, all while the video chat continues to proceed without interruption. The improved technique thus provides a near-hands-on support experience from a remote customer support agent regardless of the customer support agent's physical location.

Having described certain embodiments, numerous alternative embodiments or variations can be made. For example, although the video channel 242 has been described for the purpose of conducting a face-to-face video chat with the customer support agent, it is understood that the user may employ the video channel for other purposes, such as for providing the customer support agent with a visual walk-around and inspection of the electronic system 110. For example, the user may point the camera 126 at the electronic system 110 and/or selected parts thereof and/or may toggle the source of video for the video chat to the rear-facing camera 210, thereby providing the customer support agent with an even more accurate and closer to in-person customer support experience. The user may point the camera to any visual indicators or displays, such as visual temperature indicators, equipment with visual status indicators, and so forth. In one particularly useful example, the user points the camera at an electronic component or system displaying flashing indicators, or indicators flashing in a particular sequence. Although the flashing indicators may have no meaning to the user, they may mean a great deal to the customer support agent, who can view the sequence of indicators through the video channel, decipher their meaning, and recommend remedial action.

Also, the video channel 242 has been shown and described as conveying full-duplex video and audio. This is merely an example, however. Alternatively, the video channel 242 may operate to send video images to the customer support device 150 but to receive no video images from the customer support device 150, to receive video images from the customer support device 150 but to send no images to the customer support device 150, or to switch between modes of sending video images and receiving video images. Thus, full-time, full-duplex video is not required. Neither is full-time, full-duplex audio required. Further, the images sent and received need not be video images, per se. For example, the images may be acquired, sent, and/or received in the form of still images, sequences of still images, or images in other formats. Video images are merely an example.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as media 560 and 660 in FIGS. 5 and 6). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. Although certain embodiments are disclosed herein, it is understood that these are provided by way of example only and the invention is not limited to these particular embodiments. Those skilled in the art will therefore understand that various changes in form and detail may be made to the embodiments disclosed herein without departing from the scope of the invention.

What is claimed is:

1. A non-transitory computer readable medium including instructions which, when executed by a processor of a computerized apparatus, cause the computerized apparatus to:
   display a representation of a plurality of electronic systems;
   receive a user selection of an electronic system of the plurality of electronic systems displayed in the representation;

in response to receiving the user selection, display a context-sensitive menu for performing actions in relation to the electronic system;
receive a second user selection of an item from the context-sensitive menu to launch a chat program that includes a window for conducting a video chat with a customer support device, and a control for gathering diagnostic information;
conduct the video chat with the customer support device in the window of the chat program;
compute a geographical location of the computerized apparatus;
transmit, while the video chat operates over a video channel, the computed geographical location of the computerized apparatus to the customer support device over a data channel to identify the electronic system to the customer support device; and while the video chat is conducted with the customer support device,
gather diagnostic information from the electronic system that is connected to the computerized apparatus over a network, the diagnostic information being gathered over the network, in response to a third user selection of the control in the chat program, and independent of the customer support device, the diagnostic information indicating an improper condition of the electronic system;
transmit the gathered diagnostic information to the customer support device; and thereafter,
receive remedial information from the customer support device that includes firmware, software, or a link to the firmware or the software to address the improper condition of the electronic system, wherein access to the remedial information received from the customer support device is initiated in response to user input within the chat program at the computerized apparatus, subsequent to the remedial information being received by the computerized apparatus and independent of the customer support device.

2. The non-transitory computer readable medium of claim 1, further including instructions which, when executed by the processor, cause the computerized apparatus to:
transmit the diagnostic information over the data channel while the video chat is simultaneously conducted over the video channel; and
receive the remedial information over the data channel while the video chat is simultaneously conducted over the video channel.

3. The non-transitory computer readable medium of claim 1, wherein the computerized apparatus is a mobile computing device, and further including instructions which, when executed by the processor, cause the mobile computing device to connect to the electronic system over the network.

4. The non-transitory computer readable medium of claim 1,
wherein the diagnostic information transmitted to the customer support device indicates an improper firmware component of the electronic system,
wherein the remedial information received from the customer support device includes another firmware component or a link to the another firmware component to replace the improper firmware component, and
further including instructions which, when executed by the processor, cause the computerized apparatus to install the other firmware component on the electronic system.

5. The non-transitory computer readable medium of claim 1,
wherein the diagnostic information transmitted to the customer support device further indicates an improper software component of the electronic system,
wherein the remedial information received from the customer support device further includes another software component or a link to the another software component to replace the improper software component, and
further including instructions which, when executed by the processor, cause the computerized apparatus to install the other software component on the electronic system.

6. The non-transitory computer readable medium of claim 1, further including instructions which, when executed by the processor, cause the computerized apparatus to:
read an RFID (Radio Frequency Identification) tag provided with the electronic system to obtain identifying information of a component of the electronic system; and
transmit, while the video chat operates over the video channel, the identifying information obtained from the RFID tag to the customer support device over the data channel.

7. The non-transitory computer readable medium of claim 1, further including instructions which, when executed by the processor, cause the computerized apparatus to, prior to transmitting the computed geographical location, access a database to obtain identifying information of the selected electronic system based on the geographical location.

8. The non-transitory computer readable medium of claim 1, further including instructions which, when executed by the processor, cause the computerized apparatus to:
display, on a display of the computerized apparatus, a map that shows the geographical location of the computerized apparatus as well as a geographical location of the electronic system in a vicinity of the computerized apparatus;
receive a user selection of the electronic system displayed on the map; and
transmit, while the video chat operates over the video channel, information about the selected electronic system to the customer support device over the data channel.

9. The non-transitory computer readable medium of claim 1, wherein the chat program further includes a second control for transmitting the gathered diagnostic information, and the computerized apparatus is caused to transmit the gathered diagnostic information in response to a fourth user selection of the second control in the chat program.

10. A computerized apparatus, comprising:
a processor;
geographical location circuitry constructed and arranged to compute a geographical location of the computerized apparatus; and
memory, coupled to the processor, the memory storing executable instructions, which when executed by the processor cause the computerized apparatus to:
display a representation of a plurality of electronic systems;
receive a user selection of an electronic system of the plurality of electronic systems displayed in the representation;
in response to receiving the user selection, display a context-sensitive menu for performing actions in relation to the electronic system;
receive a second user selection of an item from the context-sensitive menu to launch a chat program that includes a window for conducting a video chat with a customer support device, and control for gathering diagnostic information;

conduct the video chat with the customer support device in the window of the chat program;

transmit, while the video chat is conducted with the customer support device, the computed geographical location of the computerized apparatus to the customer support device over a data channel to identify the electronic system to the customer support device; and while the video chat is conducted with the customer support device, gather diagnostic information from the electronic system that is connected to the computerized apparatus over a network, the diagnostic information being gathered over the network, in response to a third user selection of the control in the chat program, and independent of the customer support device, the diagnostic information indicating an improper condition of the electronic system;

transmit the gathered diagnostic information to the customer support device; and thereafter, receive remedial information from the customer support device that includes firmware, software, or a link to the firmware or the software to address the improper condition of the electronic system, wherein access to the remedial information received from the customer support device is initiated in response to user input within the chat program at the computerized apparatus, subsequent to the remedial information being received by the computerized apparatus and independent of the customer support device.

11. The computerized apparatus of claim 10, the memory storing further executable instructions, which when executed by the processor further cause the computerized apparatus to:

conduct the video chat over a video channel;

transmit the diagnostic information over the data channel while the video chat is simultaneously conducted over the video channel; and receive the remedial information over the data channel while the video chat is simultaneously conducted over the video channel.

12. The computerized apparatus of claim 10, wherein the computerized apparatus is a mobile computing device having a wireless network interface constructed and arranged to connect to the electronic system over the network.

13. The computerized apparatus of claim 10, further comprising an RFID (Radio Frequency Identification) reader, the memory storing further executable instructions, which when executed by the processor further cause the computerized apparatus to:

read an RFID tag provided with the electronic system to obtain identifying information of a component of the electronic system.

14. A computer implemented method of obtaining customer support, the method comprising a computerized apparatus:

displaying a representation of a plurality of electronic systems;

receiving a user selection of an electronic system of the plurality of electronic systems displayed in the representation;

in response to receiving the user selection, displaying a context-sensitive menu for performing actions in relation to the electronic system;

receiving a second user selection of an item from the context sensitive menu to launch a chat program that includes a window for conducting a video chat with a customer support device, and a control for gathering diagnostic information;

conducting the video chat with the customer support device in the window of the chat program;

computing a geographical location of the computerized apparatus;

transmitting, while the video chat operates over a video channel, the computed geographical location of the computerized apparatus to the customer support device over a data channel to identify the electronic system to the customer support device;

and while the video chat is conducted with the customer support device, gathering diagnostic information from the electronic system that is connected to the computerized apparatus over a network, the diagnostic information being gathered over the network, in response to the third user selection of the control in the chat program, and independent of the customer support device, the diagnostic information indicating an improper condition of the electronic system;

transmitting the gathered diagnostic information to the customer support device; and thereafter, receiving remedial information from the customer support device that includes firmware, software, or a link to the firmware or the software to address the improper condition of the electronic system, wherein access to the remedial information received from the customer support device is initiated in response to user input within the chat program at the computerized apparatus, subsequent to the remedial information being received by the computerized apparatus and independent of the customer support device, wherein at least one step of the method is performed by a processor of the computerized apparatus.

15. The method of claim 14, further comprising:

conducting the video chat over the video channel;

transmitting the diagnostic information over the data channel while the video chat is simultaneously conducted over the video channel; and receiving the remedial information over the data channel while the video chat is simultaneously conducted over the video channel.

16. The method of claim 15, further comprising:

displaying, on a display of the computerized apparatus, a map that shows the geographical location of the computerized apparatus as well as a geographical location of the electronic system in a vicinity of the computerized apparatus;

receiving a user selection of the electronic system displayed on the map;

accessing a database to obtain identifying information of the selected electronic system; and transmitting, while the video chat operates over the video channel, the identifying information of the selected electronic system to the customer support device over the data channel.

17. The method of claim 16, wherein displaying the map includes showing geographical locations of multiple electronic systems in the vicinity of the computerized apparatus, and wherein receiving the user selection of the electronic system displayed on the map includes receiving a user selection of one of the multiple electronic systems shown on the displayed map.

* * * * *